US011872588B2

(12) United States Patent
Fritz et al.

(10) Patent No.: US 11,872,588 B2
(45) Date of Patent: Jan. 16, 2024

(54) APPLICATION METHOD AND APPLICATION SYSTEM

(71) Applicant: Durr Systems AG, Bietigheim-Bissingen (DE)

(72) Inventors: Hans-Georg Fritz, Ostfildern (DE); Benjamin Wohr, Eibensbach/Guglingen (DE); Marcus Kleiner, Besigheim (DE); Timo Beyl, Besigheim (DE); Frank Herre, Oberriexingen (DE)

(73) Assignee: DÜRR SYSTEMS AG, Bietigheim-Bissingen (DE)

( * ) Notice: Subject to any disclaimer, the term of this patent is extended or adjusted under 35 U.S.C. 154(b) by 212 days.

(21) Appl. No.: 17/410,023

(22) Filed: Aug. 24, 2021

(65) Prior Publication Data

US 2021/0379620 A1 Dec. 9, 2021

Related U.S. Application Data

(62) Division of application No. 14/766,459, filed as application No. PCT/EP2014/000276 on Feb. 3, 2014, now Pat. No. 11,117,160.

(30) Foreign Application Priority Data

Feb. 11, 2013 (DE) ........................ 102013002412.9

(51) Int. Cl.
*B05D 1/02* (2006.01)
*B05D 5/06* (2006.01)
(Continued)

(52) U.S. Cl.
CPC .................. *B05D 1/02* (2013.01); *B05B 1/02* (2013.01); *B05B 1/14* (2013.01); *B05B 12/124* (2013.01);
(Continued)

(58) Field of Classification Search
CPC .................................. B05D 1/02; B05D 5/06
See application file for complete search history.

(56) References Cited

U.S. PATENT DOCUMENTS 5,112,656 A 5/1992 Nakamura et al.
8,397,662 B2 3/2013 Herre et al.
(Continued)

FOREIGN PATENT DOCUMENTS

DE 3835078 C2 1/1993
DE 102009004878 A1 7/2010
(Continued)

OTHER PUBLICATIONS

International Search Report and Written Opinion for PCT/EP2014/000276 dated Apr. 8, 2014 (with English translation; 15 pages).
(Continued)

*Primary Examiner* — Nathan T Leong
(74) *Attorney, Agent, or Firm* — Bejin Bieneman PLC

(57) ABSTRACT

Applying a coating medium may include: emission of a coating medium jet from an application device and positioning the application device relative to the component with a particular application distance between the application device and the component, so that the coating medium jet impacts on the component and coats the component. The application distance (d) can be smaller than the disintegration distance of the coating medium jet, so that the coating medium jet impacts with its continuous region on the component.

20 Claims, 5 Drawing Sheets

(51) Int. Cl.
*B05C 5/02* (2006.01)
*B05C 11/10* (2006.01)
*B05B 12/12* (2006.01)
*B05B 1/14* (2006.01)
*B05B 1/02* (2006.01)

(52) U.S. Cl.
CPC .......... *B05C 5/027* (2013.01); *B05C 11/1018* (2013.01); *B05D 5/06* (2013.01); *B05D 2252/00* (2013.01)

(56) References Cited

U.S. PATENT DOCUMENTS

| | | | | |
|---|---|---|---|---|
| 8,846,155 | B2 | 9/2014 | Herre et al. | |
| 2004/0217202 | A1* | 11/2004 | Hynes | B05C 5/0216 239/380 |
| 2004/0261701 | A1* | 12/2004 | Kobayashi | G03F 7/162 427/427.2 |
| 2011/0023222 | A1* | 2/2011 | Tanus | B05D 5/061 4/584 |
| 2011/0262622 | A1 | 10/2011 | Herre et al. | |
| 2012/0276281 | A1 | 11/2012 | Adams et al. | |
| 2013/0284833 | A1* | 10/2013 | Fritz | B05B 17/0607 239/102.1 |

FOREIGN PATENT DOCUMENTS

| | | | |
|---|---|---|---|
| DE | 102010019612 | A1 | 11/2011 |
| EP | 1745858 | A2 | 1/2007 |
| JP | S5845773 | A | 3/1983 |
| JP | S60183066 | A | 9/1985 |
| JP | S62129181 | A | 6/1987 |
| JP | S6461987 | A | 3/1989 |
| JP | H0161987 | U | 4/1989 |
| JP | H07246362 | A | 9/1995 |
| JP | 2013530816 | A | 8/2013 |
| WO | 2010046064 | A1 | 4/2010 |
| WO | 2011138048 | A1 | 11/2011 |

OTHER PUBLICATIONS

Anonymous: “Flussigkeitsstrahl—Wikipedia”, Wikipedia, Jul. 23, 2016, XP055598680, Found on the Internet: URL: https://de.wikipedia.org/wiki/Flussigkeitsstrahl [foun don Jun. 24, 2019] (24 pages; with English translation).

Office Action from the EPO for Application No. 14704076.0-1108 dated Jun. 28, 2019 (16 pages).

Notification of Reasons of Rejection from JPO for Application No. JP2015-556416 dated Dec. 7, 2017 (with English translation; 16 pages).

* cited by examiner

APPLICATION METHOD AND APPLICATION SYSTEM

CROSS-REFERENCE TO RELATED APPLICATIONS

This application is a divisional of and claims priority to U.S. patent application Ser. No. 14/766,459, filed on Aug. 7, 2015, which claims priority to Patent Cooperation Treaty Patent Application No. PCT/EP2014/000276, filed on Feb. 3, 2014, which claims priority to German Application No. DE 10 2013 002 412.9, filed Feb. 11, 2013, each of which applications are hereby incorporated herein by reference in their entireties.

BACKGROUND

The present disclosure relates to an application method and an application system for the application of a coating medium (e.g., paint, sealant, parting medium, adhesive, functional layer) onto a component (e.g., a motor vehicle bodywork component).

From DE 10 2010 019 612 A1 there is known a coating method in which a jet of droplets of the coating medium is created which impacts on the component surface to be coated. The droplet disintegration of the initially continuous coating material jet is specifically forced by the coupling-in of vibrations so that the disintegration distance of the coating material jet is smaller than the painting distance, i.e., the distance between the application device and the component surface.

However, this known application method by means of a droplet jet is lacking.

Reference is also made, with regard to the prior art, to DE 38 35 078 C2 and DE 10 2009 004 878 A1.

SUMMARY

The present disclosure incorporates the general technical teaching of not forcing disintegration into droplets—as in DE 10 2010 019 612 A1—specifically through the coupling-in of vibrations, but rather of using the continuous region of the coating medium jet for coating. Within the context of the present disclosure, the application distance (i.e., the distance between, firstly, the discharge opening of the application device and, secondly, the component surface to be coated) is therefore selected to be smaller than a disintegration distance of the coating medium jet, i.e., a length of a continuous region of the coating medium jet between the discharge opening of the application device and the end of the continuous region at the transition to disintegration into droplets. This has the result that the coating medium jet impacts with its continuous region onto the component, which leads to a better coating result.

In the application method according to the present disclosure, in accordance with the aforementioned prior art, a coating medium jet is emitted from an application device wherein, after emerging from the application device, the coating medium jet initially has a continuous region in the jet direction until said jet reaches a disintegration distance, whereupon after said disintegration distance after emission from the application device, the coating medium jet then disintegrates naturally (by natural disintegration according to Rayleigh as is known) into droplets which are separate from one another in the jet direction.

The concept of a coating medium jet as used in the context of the present disclosure covers both one and a plurality of coating medium jets, although for the sake of simplicity, the singular form is used herein. The coating medium jet is to be distinguished from a coating mist, as emitted, for example, by conventional rotary atomisers. The coating medium jet according to the present disclosure is therefore distinguished by a coherent cross-section, a small spread angle compared to an atomising mist, and a very small lateral extent, which is important particularly for paint application of details.

Furthermore, the application method according to the present disclosure provides, in agreement with the aforementioned prior art, that the application device is positioned, relative to the component to be painted (e.g., motor vehicle bodywork component) with a particular application distance between the application device and the component, so that the coating medium jet impacts on the component and coats the component.

By suitable positioning of the application device relative to the component, detailed paint application is possible, because the cross-section of the coating medium jet is relatively small and defined. Therefore, it is also possible to coat selectively just one correspondingly small region of the component surface.

However, it is also possible, alternatively, that the component is coated areally with the coating medium in that the coating medium jet moves over the component surface in a plurality of adjacent or overlapping strips.

The application method according to the present disclosure differs from the aforementioned prior art in that the application distance is selected to be smaller than the disintegration distance of the coating medium jet, so that that coating medium jet impacts on the component with its continuous region. In the known prior art described in the introductory part, therefore, individual droplets of the coating medium impact on the component surface, whereas according to the present disclosure, a continuous coating medium jet impacts on the component.

The concept of a coating medium used in the context of the present disclosure is to be understood generally and covers, for example, paint (e.g., base coat paint, clear lacquer), sealant, parting medium, functional layer and adhesive. In an example embodiment of the present disclosure, however, painting of details is provided, wherein a paint is applied. The category of functional layer includes all coatings which have the result of surface functionalisation, such as adhesion promoters, primers, stone chipping protective layer or layers for reducing transmission.

For example, the coating medium jet can apply a pattern on the component, for example, a stripe (e.g., design stripes, decorative stripes). However, the concept of a pattern used in the context of the present disclosure is to be understood generally and is not restricted to stripes. For example, the pattern can also be a graphic design, for example, a silhouette of a jumping horse on a motor vehicle bonnet or a chequered flag on the roof of a motor vehicle body.

In contrast to conventional atomising methods by means of rotary atomisers, with the application method according to the present disclosure, a sharp-edged pattern can be achieved, which is important for a high quality impression. Firstly, the concept of a sharp-edged pattern used within the context of the present disclosure means that the edge of the pattern has very small deviations in relation to a pre-defined edge form, which are preferably smaller than 3 mm, 1 mm, 0.5 mm 0.2 mm or even 0.1 mm. Secondly, the expression "sharp-edged pattern" used in the context of the present disclosure also means that, outside of the coated pattern, no coating medium splashes impact on the component surface.

It has already been briefly mentioned above that application methods according to the present disclosure are also suitable for areal component coating. For this purpose, the coating medium jet can be moved over the component a plurality of times, a coating medium strip being applied in each case. In this way, by means of a meandering guidance of the coating medium jet, numerous parallel coating medium strips can be applied.

In one variant, following the application, the individual coating medium strips merge into one another and then form a uniform strip or a uniform coating medium layer.

In another variant, however, the individual coating medium strips do not merge into one another, but rather, in the finished state, form two or more separate strips.

It has been briefly mentioned above that the expression "pattern," as used in the context of the present disclosure can refer to a stripe that is applied to the component surface. Using the application method according to the present disclosure, extremely narrow strips can advantageously be applied, having a width of less than 1 m, 10 cm, 5 cm, 2 cm, 1 cm, 5 mm, 2 mm, 1 mm, 400 μm or even less than 200 μm. However, the individual strips preferably have a width of at least 100 μm, 200 μm, 400 μm, 1 mm, 2 mm, 5 mm, 1 cm, 2 cm, 5 cm, 10 cm or even 1 m.

In an exemplary embodiment, the application device emits not only a single coating medium jet, but emits a plurality of coating medium jets that are oriented substantially parallel to one another. The distance between the directly adjacent coating medium jets may be large enough that the directly adjacent coating medium jets do not merge between the application device and the component, but impact on the component surface as separate coating medium jets, but still merge into one area on the component.

A plurality of application nozzles which have a particular nozzle internal diameter and are arranged at a particular nozzle spacing can be provided for the emission of the individual coating medium jets. To prevent merging of adjacent coating medium jets between the application nozzles and the component surface, the nozzle spacing between the directly adjacent application nozzles may be at least equal to three times, four times or six times the nozzle internal diameter.

The individual application nozzles are preferably arranged together in a perforated plate, which enables economical manufacturing.

Furthermore, the possibility exists within the scope of the present disclosure that the individual application nozzles or regions with a plurality of nozzles can be controlled independently of one another, so that the coating medium jets emerging from the individual application nozzles have different operating variables. For example, the emission velocity of the coating medium from the application nozzles, the type of coating medium or the volume flow rate of the emitted coating medium can be individually set for the individual application nozzles or regions.

It has been mentioned above that the application device is moved relative to the component during the application of the coating medium, so that the coating medium jet moves along a corresponding strip with the impact point thereof on the component surface.

In a variant, the application device can be arranged in a fixed position while the component is moved. The movement speed may be at least 10 cm/s, 50 cm/s, 1 m/s, 1.5 m/s and a maximum of 10 m/s, 5 m/s or a maximum of 1 m/s. This variant is per se known from EP 1 745 858 A2, so that the content of this patent application is fully incorporated by reference in its entirety within the present description with regard to the relative movement of the application device and the component.

In another variant, however, the component can be arranged in a fixed position while the application device is moved. In this regard, the movement speed may be at least 10 cm/s, 20 cm/s, 30 m/s, 50 cm/s, 1 m/s or at least 2 m/s and a maximum of 250 cm/s, 700 mm/s, 500 mm/s or a maximum of 100 mm/s.

Furthermore, the relative movement between the application device and the component to be coated can be achieved in that both the application device and the component to be coated are moved.

It has previously been mentioned briefly that the application device is moved relative to the component, over the component surface, so that the impact point of the coating medium jet on the component surface moves along a strip which is then coated with the coating medium. In this regard, the possibility exists that, during the travel along the strip on the component surface, the coating medium jet is briefly switched off or interrupted and is subsequently switched on again or continued so that the path covered has a gap on the component surface which is not coated with the coating medium. Within the scope of the present disclosure, the coating medium jet can be moved so slowly over the component surface and switched on or off so rapidly that a spatial resolution of less than 5 mm, 2 mm or 1 mm on the component is achieved. This is advantageous particularly for painting of details of a pattern.

An advantage of the application method according to the present disclosure lies in avoiding overspray and/or in increasing the application efficiency, i.e., the proportion of the applied coating medium which is actually deposited on the component surface. The coating medium jet is therefore preferably only switched on when the coating medium jet also actually impacts on the component surface. During the coating of a component with a lateral edge, the application device may be therefore moved toward the edge in the lateral direction with the coating medium jet switched off. The coating medium jet is then only switched on when the application device is situated over the edge, so that the switched-on coating medium jet then actually impacts on the component. Subsequently, the application device is moved over the component to be coated along the component surface to be coated to apply a corresponding strip of the coating medium. The coating medium jet is then switched off again when the application device is moved across a lateral edge of the component to be coated, since the coating medium jet would then no longer impact on the component surface.

To enable the suitable switching on and/or off of the coating medium jet, the spatial positions of the component to be coated and of the application device are preferably detected to be able to deduce therefrom whether the coating medium jet would impact on the component surface. The coating medium jet then may be switched off when the detected positions of the component and the application device enable the conclusion that the coating medium jet would not impact on the component surface. The coating medium jet can, however, be switched on only when the detected positions of the component and the application device enable the conclusion that the coating medium jet would actually impact on the component surface.

The aforementioned position detection can be carried out, for example, by a camera, an ultrasonic sensor, an inductive or capacitive sensor or by a laser sensor. The possibility also exists, however, that the positions of the component and the application device are read out from a machine or robot control system, provided the component and the application device are positioned by a machine or a robot.

It was mentioned above that the application method according to the present disclosure enables a high application efficiency which can be greater, for example, than 80%, 90%, 95% or even greater than 99%, so that substantially the whole of the applied coating medium is entirely deposited on the component without any noteworthy overspray occurring.

Furthermore, the application method according to the present disclosure enables a relatively high area coating performance of at least 0.5 $m^2$/min, 1 $m^2$/min or 3 $m^2$/min. The area coating performance can be increased almost as desired in that the number of application nozzles in the application device is increased accordingly.

It should also be mentioned that rebounding of the coating medium jet from the component after impacting on the component should be prevented, since this would lead to troublesome coating medium splashes which prevent sharp-edged painting. The volume flow of the coating agent applied and thus the emission velocity of the coating medium are therefore preferably set so that the coating medium does not rebound from the component after impacting on the component.

The emission velocity of the coating medium is herein preferably at least 5 m/s, 7 m/s or 10 m/s and a maximum of 30 m/s, 20 m/s or 10 m/s.

The application distance between the discharge opening of the application device and the component surface, however, may be at least 4 mm, 10 mm or at least 40 mm and preferably a maximum of 200 mm or 100 mm.

It should also be mentioned that the application device may be moved by means of a multi-axis robot which can have serial or parallel kinematics. Such robots are per se known from the prior art and therefore need not be described in detail.

Furthermore, it has already been mentioned above that the coating medium can be a paint which is, for example, a base coat paint, a clear lacquer, an effect paint, a mica paint or a metallic paint. It should also be mentioned in this regard that the coating medium can be optionally a water-based paint or a solvent-based paint.

It should further be mentioned that, in the context of the present disclosure, the coating medium jet can be switched on or off with a switch-over duration of less than 50 ms, 20 ms, 10 ms, 5 ms or 1 ms. The switch-over duration is herein defined as the minimum duration required to switch off the coating medium jet and then to switch it on again or to switch it on and then off again.

Aside from the above-described application method, the present disclosure also covers a corresponding application system as disclosed by the description above, so that a separate description of the application system is not required.

DESCRIPTION OF THE DRAWINGS

Other advantageous developments of the present disclosure are disclosed in the subclaims or are described below in greater detail together with the description of the preferred exemplary embodiments of the present disclosure, making reference to the drawings, in which:

DESCRIPTION

Figure 1:
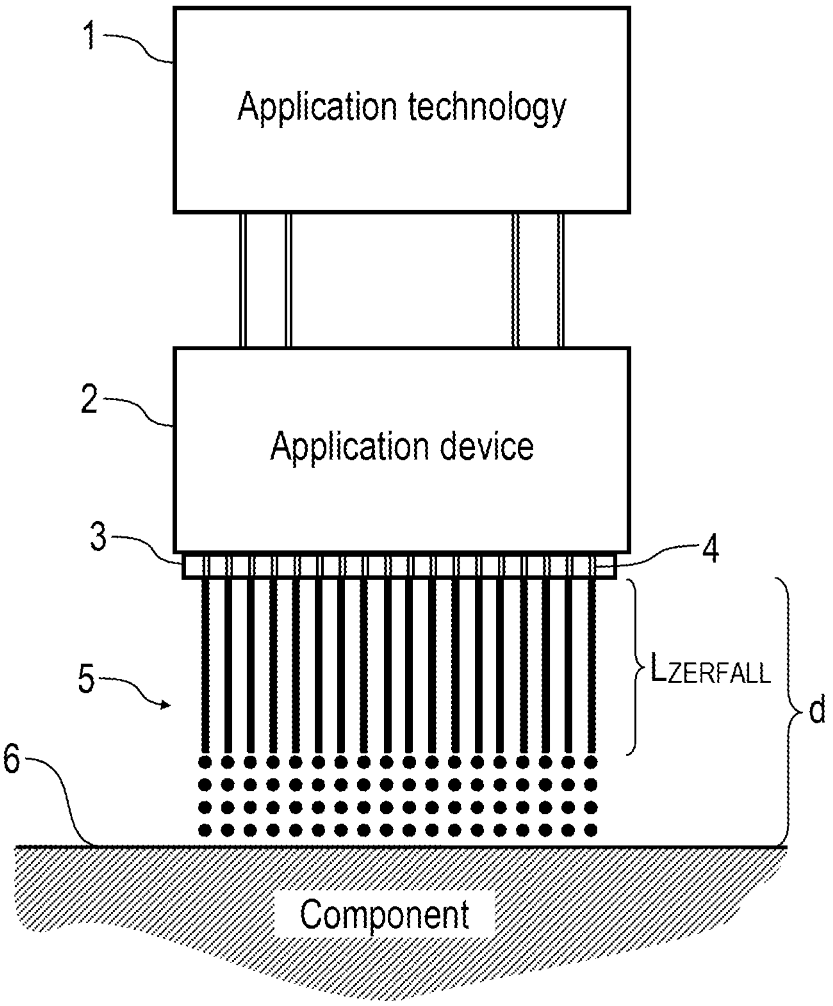
Fig. 1 Prior art
FIG. 1 shows a schematic representation of a conventional application system.

FIG. 1 shows a conventional application system as known, for example, from DE 10 2010 019 612 A1. Herein, an application technology 1 supplies an application device 2 with the required media, for example, the coating medium to be applied, which can be, for example, a paint.

The application device 2 has a perforated plate 3 in which numerous application nozzles 4 are formed. Each of the application nozzles 4 of the perforated plate 3 emits a coating medium jet 5 wherein, directly after emission from the application nozzles 4, the coating medium jets 5 initially cohere over a disintegration distance $L_{DECAY}$ in the jet direction and then disintegrate into droplets, wherein the droplet disintegration is specifically forced in this conventional application system in that vibrations are coupled in.

The application device 2 is positioned relative to a component 6 to be coated at an application distance d, wherein the positioning takes place such that the application distance d is greater than the disintegration distance $L_{DECAY}$. This means that the coating medium jets 5 do not impact on the component 6 with their continuous region, but as a succession of droplets.

Figure 2:
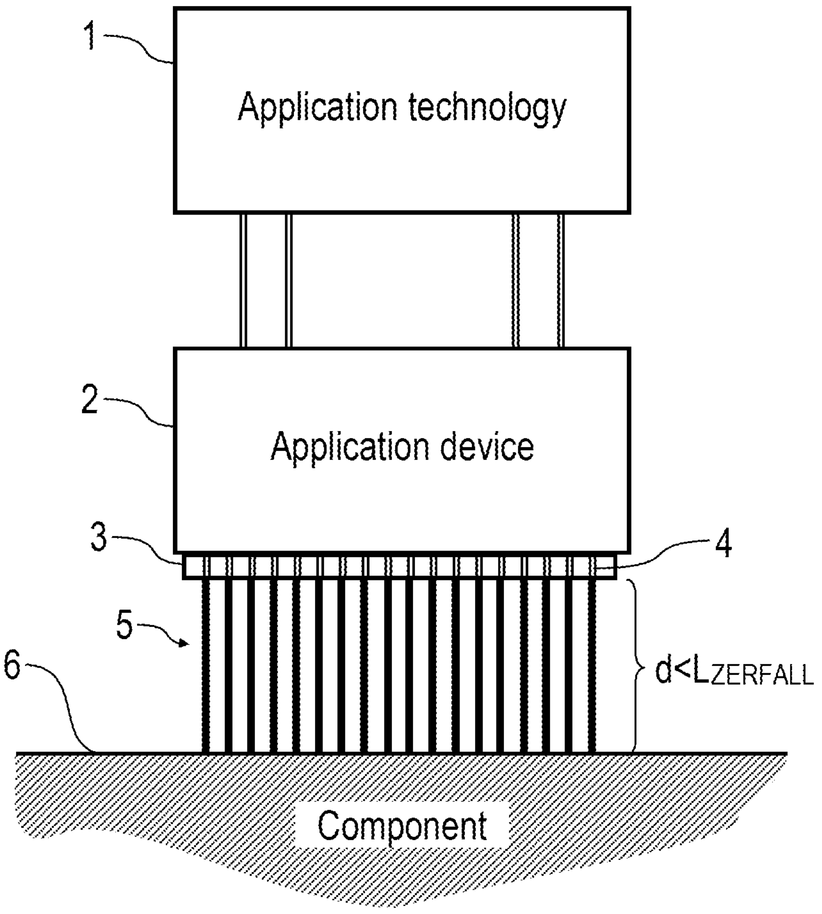
FIG. 2 shows a schematic representation of an exemplary embodiment of an application system.

FIG. 2 shows a variation of the conventional application system according to FIG. 1 in the direction of the present disclosure. The application system according to the present disclosure as per FIG. 2 partially matches the above-described conventional application system so that for the avoidance of repetition, reference is made to the above description wherein the same reference signs are used for corresponding details.

A peculiarity of the application system according to the present disclosure lies in that the application device 2 is positioned relative to the component 6 such that the application distance d is smaller than the disintegration distance $L_{DECAY}$. This means that the coating medium jets 5 impact on the surface of the component 6 with their continuous region in the jet direction, which leads to a better painting result.

Furthermore, the droplet disintegration of the coating medium jets 5 is herein not specifically forced by means of the coupling-in of vibrations, since it is specifically the droplet disintegration that is to be prevented within the scope of the present disclosure.

The application system according to the present disclosure enables the application of sharp-edged patterns, as shown in FIGS. 3A-3C and 4A-4C and will be described now.

Figure 3A:
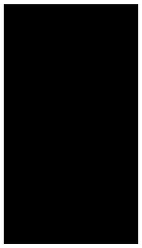
FIGS. 3A-3C and 4A-4C show different representations of sharp-edged and not sharp-edged strips of a coating medium.

Thus, FIG. 3A shows a sharp-edged stripe, as can be applied onto the component 6 with the application system according to FIG. 2.

Figure 3B:
Figure 3C:

FIGS. 3B and 3C, however, show exemplary embodiments of conventional stripes with more or less ragged edges of the stripe.

Figure 4A:
Figure 4B:
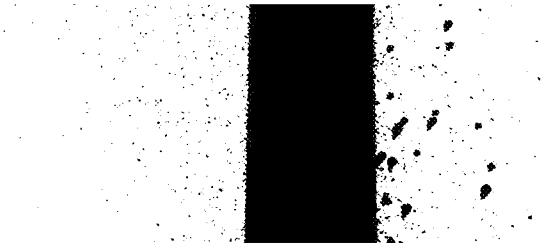
Figure 4C:
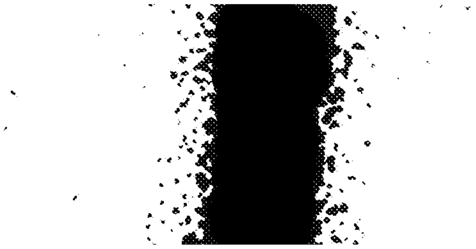

FIGS. 4A-4C also do not show sharp-edged stripes, but rather unsuitable stripes with coating medium splashes laterally next to the actual stripe.

Figure 5:
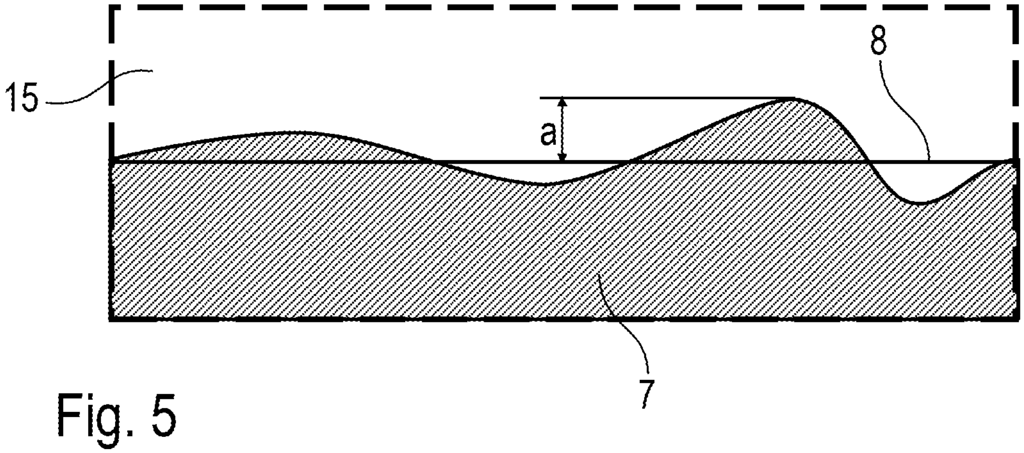
FIG. 5 shows a representation of a coating medium strip to illustrate edge-sharpness.

FIG. 5 shows a schematic representation of a stripe 7 to illustrate the edge sharpness of the strip 7. The stripe 7 has a maximum deviation a, relative to a pre-determined edge shape, wherein the deviation a within the scope of the present disclosure may be smaller than 3 mm, 1 mm or 0.5 mm. In this way, for example, a decorative stripe with a high quality appearance can be produced on a motor vehicle bodywork.

FIGS. 6A-6D show, in schematic form, the application of a paint stripe onto a component 9 wherein the component 9 is laterally delimited by two edges 10, 11.

The coating medium stripes are herein applied by means of an application device 12 wherein the application device 12 can emit coating medium jets 13 as described above.

Figure 6A:
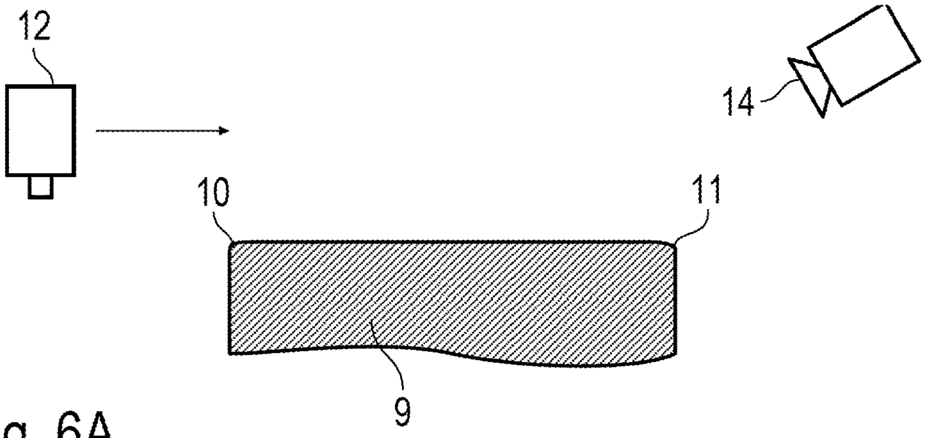
FIGS. 6A-6D show schematic representations of the switching on or switching off of the coating medium jet during component painting.

The application device 12 is initially moved toward the component 9, as shown in FIG. 6A, wherein the coating medium jet 13 is initially still switched off, since the coating medium jet 13 would not impact on the component 9 if the application device 12 is still located laterally adjoining the edge 10 of the component 9.

Figure 6B:
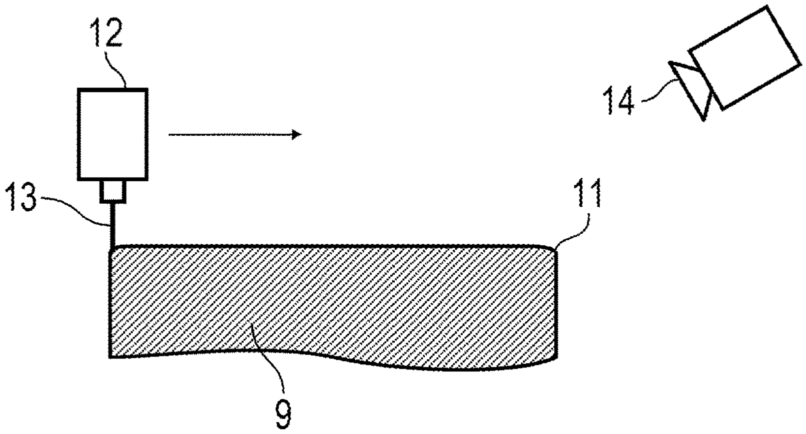

On passing the edge 10 of the component 9, the coating medium jet 13 is then switched on, as shown in FIG. 6B.

Figure 6C:
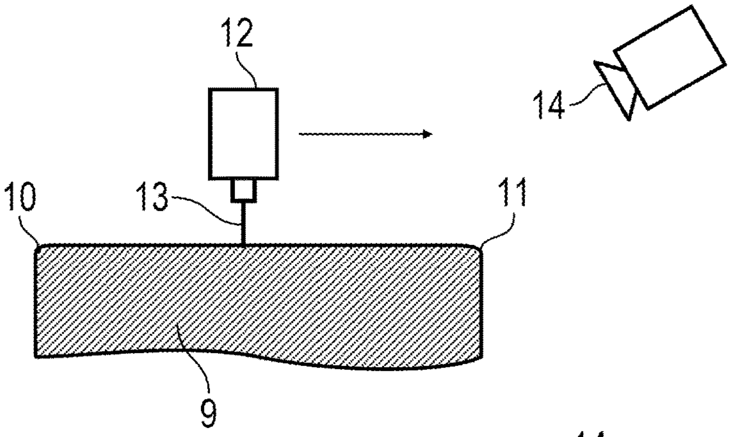

Subsequently, the application device 12 is guided, with the coating medium jet 13 switched on, over the surface of the component 9, as shown in FIG. 6C.

Figure 6D:
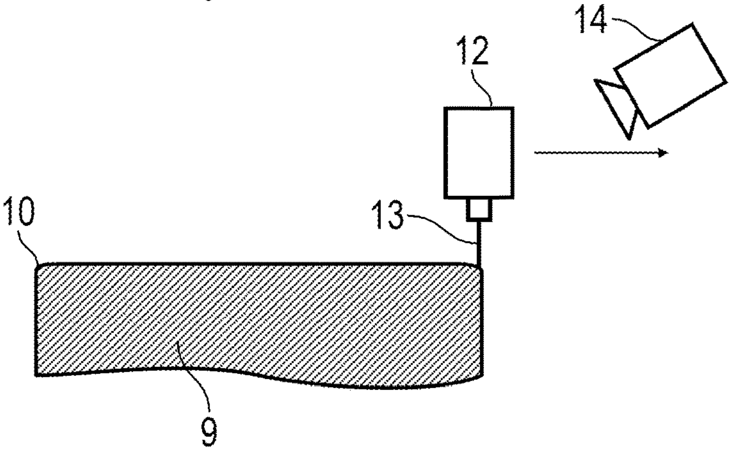

On passing the opposite edge 11 of the component 9, the coating medium jet 13 is then switched off again, as shown in FIG. 6D, since on subsequent further movement of the application device 12 beyond the edge 11 of the component 9, the coating medium jet 13 would no longer impact on the surface of the component 9.

With this switching on and off of the coating medium jet 13, an exceptionally high application efficiency level can be achieved almost without overspray.

The precise switching on and off of the coating medium jet 13 is enabled in that the positions of the application device 12 and of the component 9 are detected by a camera sensor 14.

As previously mentioned, in place of a camera sensor, an ultrasonic sensor, an inductive or capacitive sensor or a laser sensor, which can be both firmly arranged in the environment of the application device and of the component, but can also be moved with the application device, can also be used.

Figure 7:
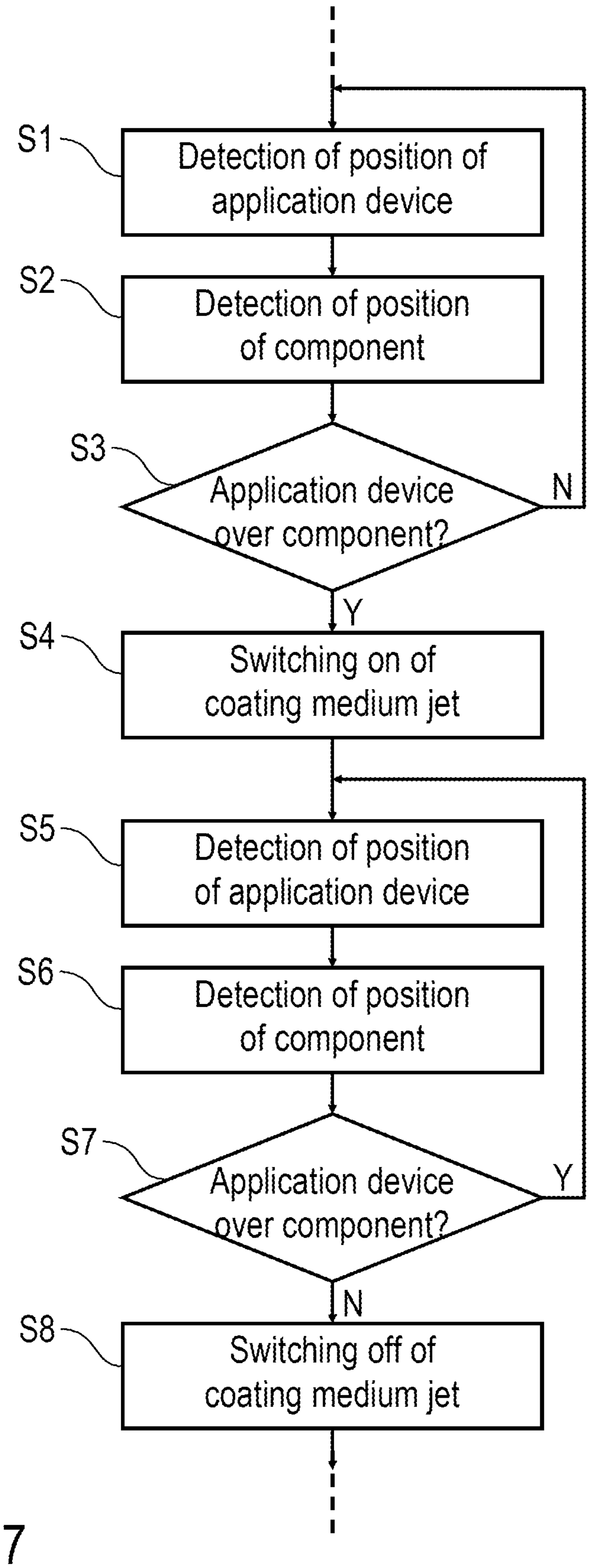
FIG. 7 shows a flow diagram corresponding to FIGS. 6A-6D.

FIG. 7 shows the operating method of the application system according to the present disclosure according to the different stages in FIGS. 6A-6D in a corresponding flow diagram.

The present disclosure is not restricted to the above-described preferred exemplary embodiments. Rather a plurality of variants and derivations is possible which also make use of the inventive concept and therefore fall within the scope of protection. In particular, the present disclosure also claims protection for the subject matter and the features of the subclaims separately from the claims to which they each refer.

The invention claimed is:

1. A method for the application of a coating medium onto a component, comprising:

emitting a coating medium jet from an application device, wherein, after emerging from the application device, the coating medium jet has a continuous region in the jet direction until said jet reaches a disintegration distance, whereupon, after the disintegration distance, the coating medium jet then disintegrates into droplets that are separate from one another in the jet direction; and positioning the application device at a specified application distance from the component so that the coating medium jet impacts on the component and coats the component;

wherein the application distance is smaller than the disintegration distance of the coating medium jet, so that the coating medium jet impacts on the component with its continuous region;

a plurality of coating medium jets that are directed to be substantially parallel to one another are emitted from the application device;

distances between directly adjacent coating medium jets are large enough such that the adjacent coating medium jets do not merge between the application device and the component; and for emission of the coating medium jets, a plurality of application nozzles with a specified nozzle internal diameter and a specified nozzle spacing are provided, wherein the nozzle spacing is at least equal to three times the nozzle internal diameter.

2. The method of claim 1, wherein the coating medium jet applies a pattern on the component; and the pattern is sharp-edged with maximum deviations from a pre-defined edge shape of a maximum of three millimetres and without coating medium splashes outside the pattern.

3. The method of claim 2, wherein the coating medium jet is moved over the component a plurality of times to generate the pattern, a coating medium stripe being applied in each of the times.

4. The method of claim 3, wherein, following the application, the adjacent coating medium stripes merge into one another thereby forming a uniform stripe.

5. The method of claim 3, wherein following the application, the adjacent coating medium stripes do not merge into one another thereby forming two or more separate stripes.

6. The method of claim 1, wherein the pattern comprises a stripe of the coating medium;

the stripe has a width of at least 100 micrometres; and the stripe has a width of a maximum of one meter.

7. The method of claim 1, wherein the application device comprises a plurality of application nozzles of which at least some can be controlled independently of one another; and at least one of the following operating variables is independently controllable:

the emission velocity of the coating medium from the application nozzles, the type of coating medium, and the volume flow rate of the coating medium through the application nozzles.

8. The method of claim 1, wherein the application device is moved relative to the component during the application of the coating medium.

9. The method of claim 8, wherein the application device is arranged stationary, whereas the component is moved;

the component is moved during the application of the coating medium at a speed of at least ten centimeters per second; and the component is moved during the application of the coating medium at a speed of a maximum of ten meters per second.

10. The method of claim 8, wherein the component is arranged stationary, whereas the application device is moved;

the application device is moved during the application of the coating medium at a speed of at least ten centimeters per second; and the application device is moved during the application of the coating medium at a speed of a maximum of 250 centimeters per second.

11. The method of claim 1, wherein the application device is moved relative to the component over the component surface, so that the impact point of the coating medium jet on the component surface moves along a strip;

during the travel along the strip on the component surface, the coating medium jet is switched off and then on again; and the coating medium jet is moved so slowly over the component surface, and is switched on and off so rapidly, that a spatial resolution of finer than five millimeters is achieved on the component.

12. The method of claim 1, further comprising:

moving the application device toward an edge of the component to be coated with the coating medium jet switched off;

switching on the coating medium jet when the application device is located over the component;

moving the application device over the component to be coated along the component surface to be coated; and switching off the coating medium jet when the application device is no longer located over the component surface to be coated.

13. The method of claim 1, further comprising:

detecting a spatial position of the component to be coated;

detecting a spatial position of the application device;

switching on the coating medium jet depending on the detected positions of the component and of the application device; and switching off the coating medium jet depending on the detected positions of the component and of the application device.

14. The method of claim 13, wherein position detection is performed by a device selected from a group consisting of:

a camera, an ultrasonic sensor, an inductive sensor, a capacitive sensor, a laser sensor, and a robot control system from which the position is read out.

15. The method of claim 1, wherein the application method comprises at least one of:

a high application efficiency of at least eighty percent, so that substantially a whole of the applied coating medium is entirely deposited on the component without overspray occurring;

an area coating output of at least 0.5 square meters per minute;

a volume flow rate of the coating agent applied and thus the emergence velocity of the coating medium are set so that the coating medium does not rebound from the component after impacting on the component;

an emergence velocity of the coating medium from the application device is at least five meters per second;

the emergence velocity of the coating medium from the application device is a maximum of thirty meters per second;

the application distance is at least four millimeters;

the application distance is a maximum of two-hundred millimeters;

the application device is moved by a machine, the coating medium is a water-based paint or a solvent-based paint; and the coating medium jet can be switched on or off with a switch-over duration of less than fifty milliseconds.

16. A method for the application of a coating medium onto a component, comprising:

sensing an application distance between an application device and the component;

emitting a coating medium jet from the application device onto the component only when the application distance is less than a disintegration distance defined by the coating medium jet, the coating medium emitted from the coating medium jet having a continuous region in a jet direction until the coating medium is at the dis integration distance, whereupon, after the disintegration distance, the coating medium then disintegrates into droplets that are separate from one another in the jet direction;

the application device is moved relative to the component over the component surface, so that the impact point of the coating medium jet on the component surface moves along a strip;

during the travel along the strip on the component surface, the coating medium jet is switched off and then on again; and the coating medium jet is moved so slowly over the component surface, and is switched on and off so rapidly, that a spatial resolution of finer than five millimeters is achieved on the component.

17. The method of claim 16, further comprising switching on and switching off the emission of the coating medium jet from the application device based on positions of the application device and the component detected by a camera.

18. A method for the application of a coating medium onto a component, comprising:

emitting a coating medium jet from an application device, wherein, after emerging from the application device, the coating medium jet has a continuous region in the jet direction until said jet reaches a disintegration distance, whereupon, after the disintegration distance, the coating medium jet then disintegrates into droplets that are separate from one another in the jet direction; and positioning the application device at a specified application distance from the component so that the coating medium jet impacts on the component and coats the component;

wherein the application distance is smaller than the disintegration distance of the coating medium jet, so that the coating medium jet impacts on the component with its continuous region; and wherein the application method comprises at least one of:

a high application efficiency of at least eighty percent, so that substantially a whole of the applied coating medium is entirely deposited on the component without overspray occurring;

an area coating output of at least 0.5 square meters per minute;

a volume flow rate of the coating agent applied and thus the emergence velocity of the coating medium are set so that the coating medium does not rebound from the component after impacting on the component;

an emergence velocity of the coating medium from the application device is at least five meters per second;

the emergence velocity of the coating medium from the application device is a maximum of thirty meters per second;

the application distance is at least four millimeters;

the application distance is a maximum of two-hundred millimeters;

the application device is moved by a machine, the coating medium is a water-based paint or a solvent-based paint; and the coating medium jet can be switched on or off with a switch-over duration of less than fifty milliseconds.

19. The method of claim 18, wherein the application distance is no greater than 200 mm.

20. The method of claim 18, wherein the application device is moved relative to the component over the component surface, so that the impact point of the coating medium jet on the component surface moves along a strip;

during the travel along the strip on the component surface, the coating medium jet is switched off and then on again; and the coating medium jet is moved so slowly over the component surface, and is switched on and off so rapidly, that a spatial resolution of finer than five millimeters is achieved on the component.

* * * * *